UNITED STATES PATENT OFFICE.

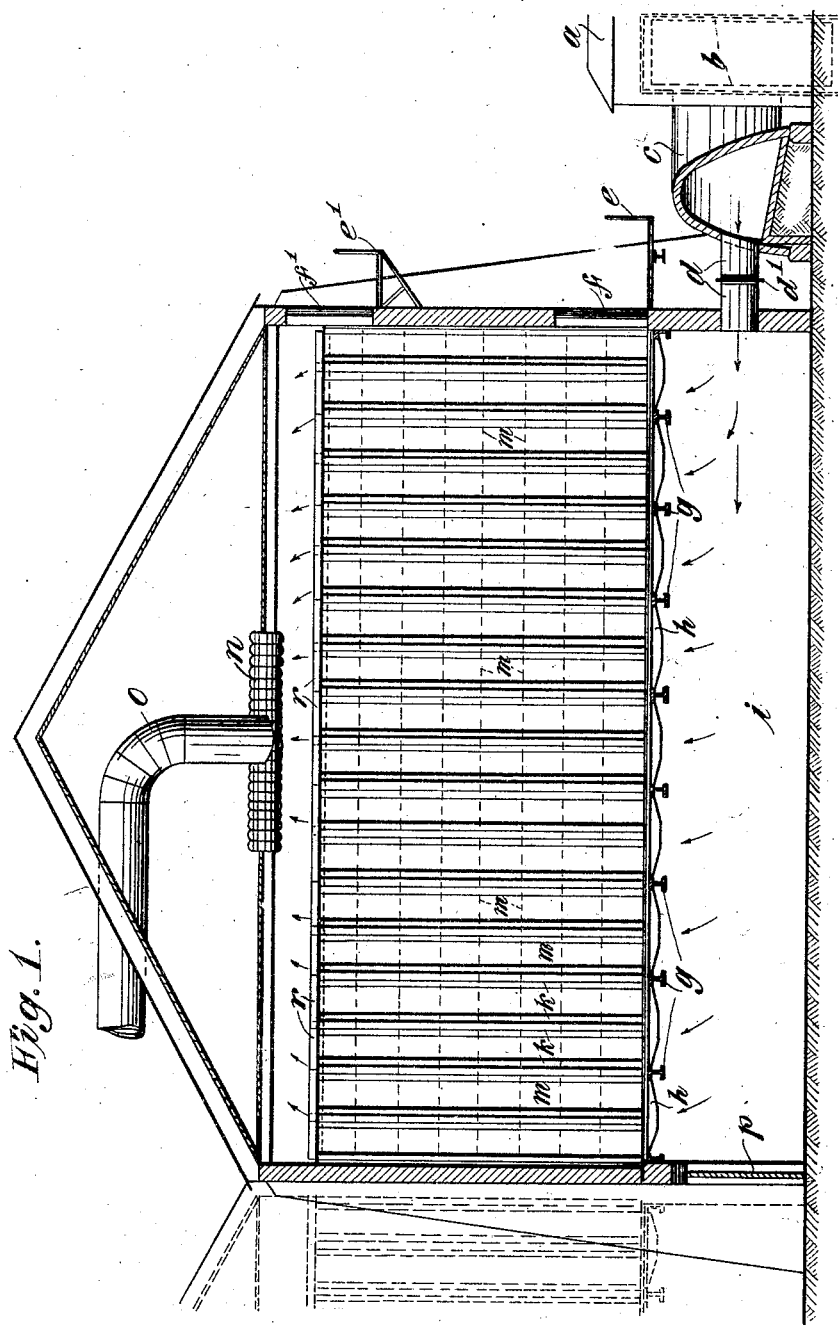

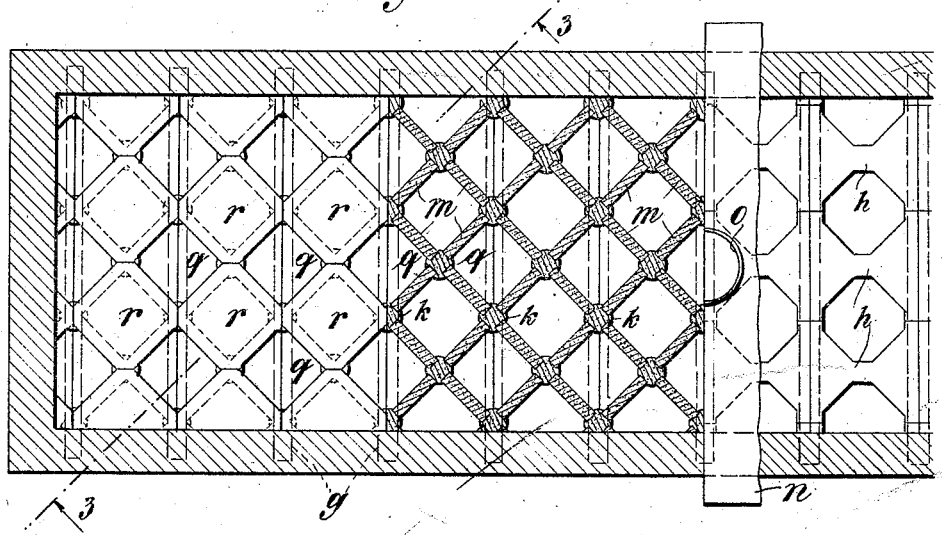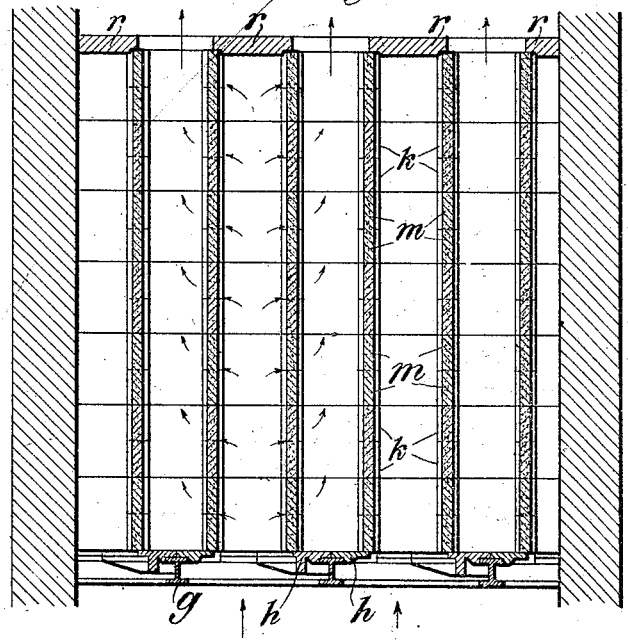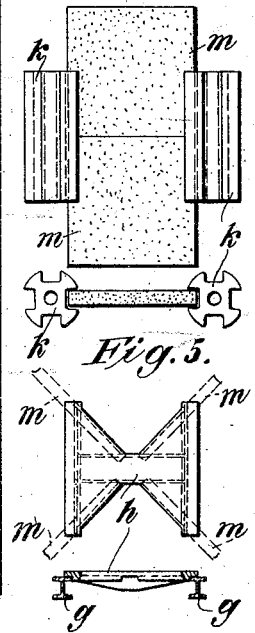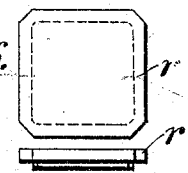

EDMUND GYBBON SPILSBURY, OF NEW ROCHELLE, NEW YORK, ASSIGNOR TO JUST PROCESS COMPANY, OF SYRACUSE, NEW YORK, A CORPORATION OF NEW YORK.

APPARATUS FOR SEPARATING SOLID PARTICLES FROM GASEOUS FLUIDS.

994,282.  Specification of Letters Patent.  Patented June 6, 1911.

Application filed May 7, 1910. Serial No. 559,932.

*To all whom it may concern:*

Be it known that I, EDMUND GYBBON SPILSBURY, a citizen of the United States, and a resident of the city of New Rochelle, in the county of Westchester and State of New York, have invented certain new and useful Improvements in Apparatus for Separating Solid Particles from Gaseous Fluids, of which the following is a specification, reference being had to the accompanying drawings, forming a part hereof.

This invention particularly relates to the separating of solid or heavy particles from gaseous fluids as is necessary in the metallurgical processes for instance in the obtaining of zinc or lead oxids from the gases which emanate from the furnaces and it is also applicable to the separating of foreign matter from gaseous fluids as for example such matter as dust from air or the heavy particles from smoke and the like.

Another feature of this invention relates to the separating of solid matter from gaseous fluids by forcing the fluids through a porous rigid septum which in devices used in metallurgical processes must generally possess heat and acid resisting qualities. The septum utilized in the construction described is a porous silica sponge but it is to be understood that the invention is not limited to this particular element as any other filtering medium may be utilized which possesses substantially the same characteristics and accomplishes the purpose in a proper manner.

Another feature of the invention relates to the separating of the deposited particles from the septum preferably by forcing or drawing fluid through the septum in a direction reverse to that in which the gases flowed at the time the heavy particles were being deposited thereupon.

As showing one embodiment of apparatus for carrying out the invention, reference is made to the drawing forming a part of this specification.

Figure 1 represents a transverse view of the apparatus. Fig. 2 represents a sectional plan view, a portion of the same showing the cell with the covers on part of the cells, with the covers removed from another part of the cells, with a hood over still another part and the portion at the extreme right showing the arrangement of plates at the lower portion of the cells. Fig. 3 is a sectional view taken along the line 3—3 in Fig. 2. Fig. 4 shows the detail construction of a section of the filtering septum and the corner member therefor. Fig. 5 shows a detail of the supporting plate resting upon an I-beam and Fig. 6 shows a detail of the cover plate.

It will be mentioned that the drawings are not intended to illustrate an apparatus complete in all its accessories but is simply designed to illustrate the essential features of the invention.

In the drawings $a$ represents one end of the structure from which the gaseous fluids containing the heavy particles are to be forced by the fan or blower member $b$ through the flue $c$ and from thence through the tube $d$ having the gate $d'$ serving as a means for shutting off the particular chamber which may be one of a battery of chambers, when desired. The filtering chambers may be formed similar to those at present having the ordinary side walls and these side walls carry supporting beams $g$ upon which rest the base plates $h$. These base plates are so arranged that there are solid and open portions alternating and around each of the openings there extends a vertical tier of filtering septums, composed of plates $m$ held together by corner pieces $k$ (Fig. 4), closed at the top by cover plates $r$ which are removable. It will be apparent that this arrangement constitutes a cell structure into which the gases can enter and through the walls of which the gases may be forced. The material of the septum is preferably a silica sponge in the present apparatus but the septum may be of any material which is porous and rigid, is capable of withstanding the deleterious effect of heat or acids, when necessary to withstand the same, and which is sufficiently porous to permit sufficient flow of gases therethrough in order to accomplish the purpose. It will also be noticed that the cell structure is composed of a series of vertical cells alternately open and closed at the top, those cells which are closed at the top being open at the bottom. The advantage of this arrangement is this, that the gases entering in the lower part of the chamber can pass upwardly into the cells which are closed at the top and be filtered by the vertical walls thereof through which the gases flow, and pass out of the openings in the adjoining cells at the top thereof leaving the deposits upon the interior walls of the cells which are closed at the top. By the forcing of a fluid through the septum in a reverse direction it is apparent that the deposited matter will be forced therefrom and when this is done with the septum in place the deposits will naturally drop and be received in the chamber $i$ from which they can be removed by any suitable manner as by workmen who can enter through the door $p$. The upper portion of the chamber is covered by the hood $n$ and the filtered gases can escape by means of the chimney or flue $o$. There are also carried by the walls the balconies $e$ and $e'$ from which one can enter through the doors $f$ or $f'$ to the interior of the chamber in order to do any work that is necessary therein as for example removing or replacing any of the parts of the filtering device. The fan $b$ is reversible so that it can either force the gases through the medium or can create suction sufficient to cause a flowage of fluid as air in a reverse direction therethrough sufficient to cause a removal of the deposits therefrom after the solid matter has collected on the same sufficient to effect its porosity or impede the passage of the fluids therethrough.

Various changes may be made in this structure as shown and described without departing from the spirit of my invention.

What I claim as my invention is:—

1. In a device for cleaning gaseous fluids a rigid mineral sponge septum.

2. In a device for cleaning gaseous fluids a porous rigid non-fibrous septum.

3. In a device for separating particles from gaseous fluids, a rigid mineral sponge septum and means for forcing the fluid through the septum.

4. In a device for separating solid particles from gaseous fumes, a filtering chamber containing a diaphragm of rigid sponge septum and means for forcing the fumes through the septum.

5. In a device for separating particles from gaseous fumes, a chamber inclosing filtering septums of rigid sponge and means for forcing the fumes through the septum, the filtering septums extending at angles to each other.

6. In a device of the character described, a chamber containing rigid diaphragms and means for blowing the gaseous fumes through the diaphragm at one time in order to remove particles from the fumes and for causing a suction to draw fluid in a reverse direction through the diaphragm to remove the deposited particles from the diaphragm at another time.

7. In a device of the class described, a separating means composed of porous cells, part of which have inlet and the others of which have exit openings, the cells being so arranged that a gaseous mixture can enter an inlet opening of one cell, pass through the side walls of such cell then off through the exit openings of adjacent cells.

8. In a device of the class described, a cell defined by vertically extending rigid mineral sponge elements provided with a cover and open at the bottom.

9. In a device of the class described, a cell defined by vertically extending rigid mineral sponge elements, open at the top, and closed at the bottom.

10. In a device for filtering fumes, a septum formed of rigid sponge members, one above the other.

11. In a device for filtering fumes, a septum formed of rigid sponge members one at the side of the other.

12. In a device for filtering fumes, a septum formed of rigid sponge members one supported by the other.

This specification signed and witnessed this 4th day of May A. D., 1910.

E. GYBBON SPILSBURY.

Signed in the presence of—
ANTHONY N. JESBERA,
EDWIN A. PACKARD.